June 1, 1926.                                                    1,587,466
C. A. BROWN ET AL
AUTOMATIC GLASS BLOWING MACHINE
Filed April 23, 1924          5 Sheets-Sheet 4

INVENTORS:
CARL A. BROWN,
ANDREAS C. NIELSEN,
BY
THEIR ATTORNEY.

Patented June 1, 1926.

1,587,466

UNITED STATES PATENT OFFICE.

CARL A. BROWN, OF EAST CLEVELAND, AND ANDREAS C. NIELSEN, OF CLEVELAND, OHIO, ASSIGNORS TO GENERAL ELECTRIC COMPANY, A CORPORATION OF NEW YORK.

AUTOMATIC GLASS-BLOWING MACHINE.

Application filed April 23, 1924. Serial No. 708,540.

Our invention relates to improvements in automatic machines for blowing articles from glass tubing, and more particularly to machines of this character for blowing incandescent lamp bulbs such as the machine disclosed and described in the patent of F. B. Hofstetter and F. J. Rippl, 1,330,707, February 10, 1920, for automatic glass blowing machines. The principal objects of our invention are to provide a machine of such construction as will readily adapt itself to the manufacture of incandescent lamp bulbs of various sizes such as flash light bulbs, automobile bulbs, vacuum tubes and standard incandescent lamp bulbs, to provide new and improved gripping and rotating means for the glass tubing and automatic means for lowering the same, to provide a machine of such construction that all of the driving and supporting bearings are so located that they are effectively protected from overheating, and, especially, to provide a machine having a comparatively high output and low shrinkage. Further features and advantages of our invention will appear from the detailed description and drawings of a species thereof which follows.

In the accompanying drawings

The machine is of the indexing Geneva gear type and as in the illustration shown is an eight position parallel or side by side spindle, duplex cycle or sixteen spindle machine. The frame or structure of our machine is composed of three main castings, a floor plate 10, work table 11 to which are attached the various means which form the bulb from the lower end of the glass tubing, and an upper or top tie frame 12. These three main frame units are connected or built into a substantial frame by four columns, corner posts or uprights such as four steel bars 13.

In the center of these three castings the main bearings are located, and the main or central timing shaft 14 passes through these main bearings and reaches from a radial bearing 15 as well as a thrust bearing 16 supported in the floor plate 10 (Fig. 3) up through the work table 11 and into a radial bearing 17 in the top tie frame 12. The central timing shaft 14 being a continuous rotating shaft is so timed as to make one R. P. M. in the time intended to make one pair of bulbs, or in the time it takes the machine to index from station to station and dwell at one station. Since all necessary mechanical operations to make one pair of bulbs must function once in this period of time, this shaft 14 has been provided and is used to time and operate most mechanical functions. The shaft 14 is rotated by means of an electric motor (not shown) through a set of proper ratio spur gears 18, 19 and 19′ meshing with bevel gear 20 fastened to the end of vertical shaft 21 which is supported by the bracket 21′ attached to the table 11. The shaft 21 carries the gear 22 which meshes with the gear 23 which is keyed to the shaft 14.

Figure 8:
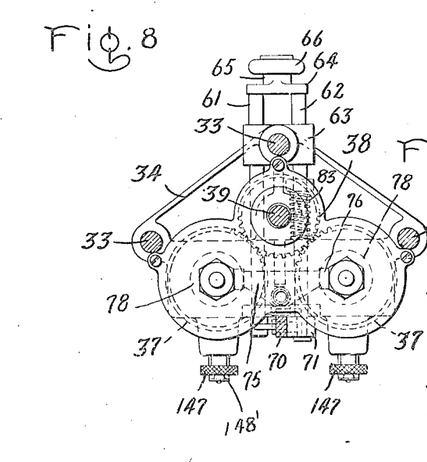
Fig. 8 is an enlarged plan view of one of the heads which carry the glass tubing.
Figure 9:
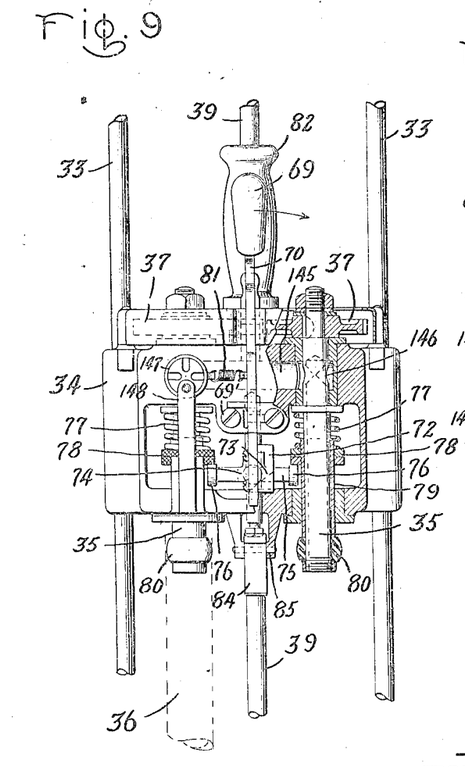
Fig. 9 is a front elevation thereof partially in section.
Figure 10:
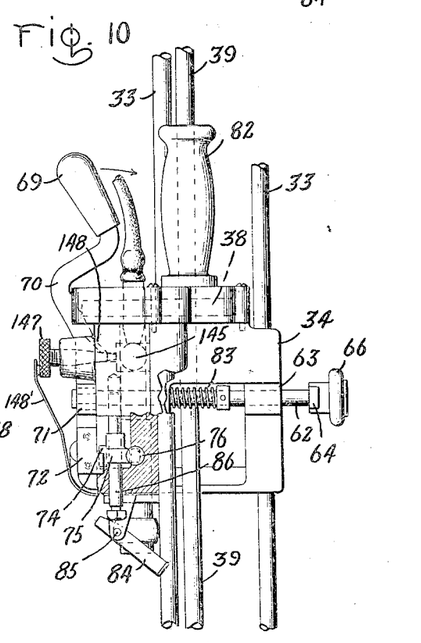
Fig. 10 is a side elevation partially in section.

Extending up through radial bearing 24 in the center of the work table 11 and resting on the thrust bearing 25 is a hollow pedestal 26 which has at one end thereof a flanged top 27 for mounting and supporting the lower carrier or spider 28. Surrounding the said pedestal 26 is a stationary casing 29 which is fastened to the work table 11 and extends up to the lower edge of the flanged top 27 of the pedestal where a circular downward projection 30 overlaps the top of this casing and assures that no glass or foreign matters can get into the same. The casing is kept full of heavy oil 29′. This is for the purpose of cooling and lubricating the parts to a point slightly above the thrust bearing 25. The lower spider 28 is attached to the flanged top 27 of the pedestal 26 by means of bolts and has extending therefrom one or more hollow steel columns 31 which support at their opposite ends an upper carrier or spider 32 thereby forming the frame work for all the indexing members. Extending upward from the spider 28 and carried above by the upper spider 32 are a number of sets of vertical rods 33 which serve as guides for the heads 34, each head having a pair of tube carrying spindles 35 (Figs. 8, 9 and 10). The spindles 35 carry the lengths of glass tubing 36 which are continuously rotated by means of the gears 37 which are attached to the upper ends of the spindles 35. The gears 37 receive their motion from the gear 38 which is mounted in the head 34 but slidably keyed to the drive shaft 39 which extends from a bearing in the lower spider 28 up through a bearing in the upper spider 32. The drive shaft 39 has attached to its upper end a gear 40 which rests above the upper spider 32 and meshes and receives its motion from a large spur gear 41 which is mounted and keyed to the central timing shaft 14. The dimensions and ratio of these gears are such that, while starting with comparative slow speed but continuous motion of the central timing shaft, the speed has been sufficiently increased before it reaches the spindles 35 to give the right rotating speed for the tube during the heating and blowing of the bulbs.

The rotating frame which carries the heads 34 and which comprises the lower spider 28, hollow steel columns 31 and upper spider 32 is intermittently rotated so as to cause each of the heads to stop for a definite period with their depending glass tubes in operative relation with one of a series of means each of which has a definite function in producing the bulbs therefrom. The said intermittent motion is controlled by a Geneva gear 42 which is keyed and fastened to the lower end of the hollow pedestal 26 and has a number of slots 43 which are engaged by a pin 44 (Fig. 13) extending from an arm 45 supported on a shaft 46 mounted in a bearing 47 of the table 11. The arm 45 is intermittently rotated by means of a clutch 48 attached to the upper end of a sleeve 48' which is slidably keyed on the drive shaft 21. The time and length of engagement is controlled by a clutching fork 49 (Fig. 15) pivotally supported at 49' by the bracket 21'. The fork 49 is operated by the timing cam 50 fastened to the central timing shaft 14. The said fork raises and lowers the clutch 48 into and out of engagement with the arm 45.

Figure 13:
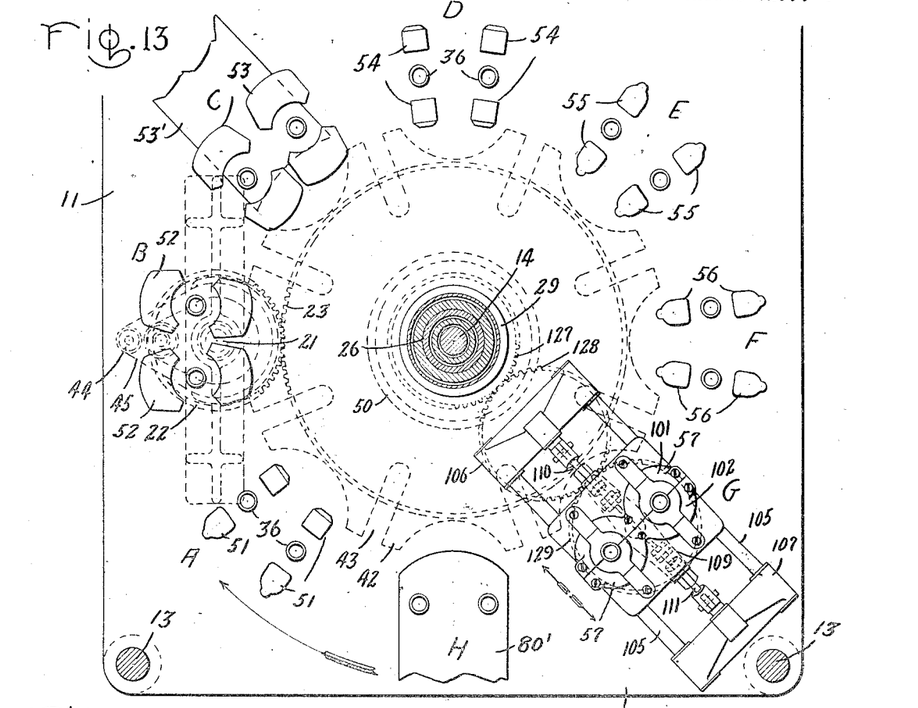
Fig. 13 is a horizontal section along the line 13—13 of Fig. 3.
Figure 14:
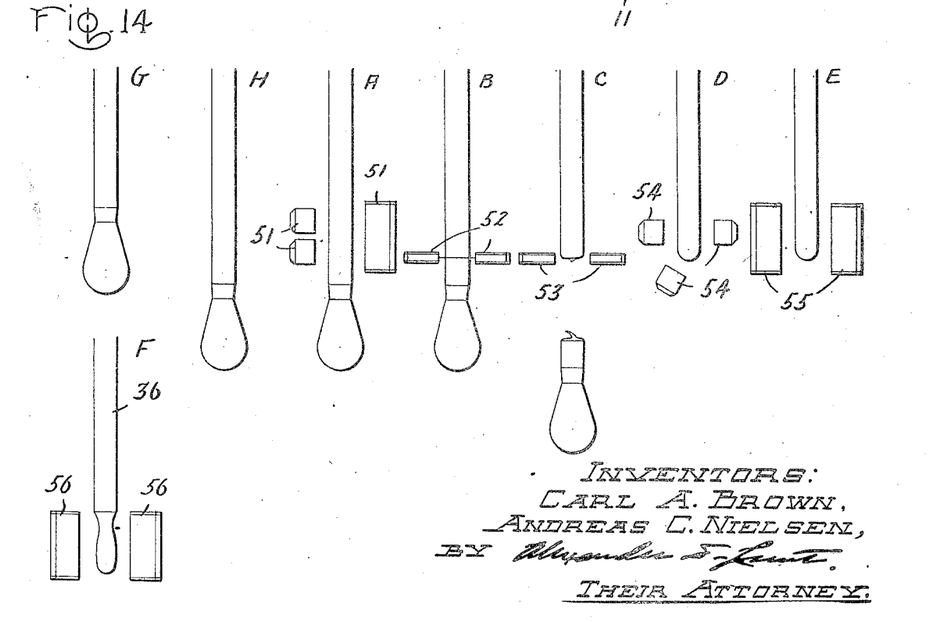
Fig. 14 represents the various steps during the operation of the machine in the formation of the completed bulb.

Referring now to Fig. 13, it will be seen that there are eight stations which are indicated as A to H. In this particular machine the number of heads 34 corresponds to the number of stations shown. At station A means are provided such as gas burners 51 for heating the lower ends of the glass tubing 36. At station B the glass tubing is heated by the preliminary cut off burners 52. At station C are located the final cut off burners 53. It is at this station that the bulbs are severed from the glass tubing and fall upon a chute 53' which conveys them to a suitable container. At station D the lower ends of the glass tubing are shaped and dressed by means of dressing burners 54. At station E the glass tubing is again heated over a somewhat larger area by means of the burners 55. At station F the glass tubing receives its final heating by means of the burners 56. At station G the plastic ends of the glass tubing are formed into the desired article which, in this case, is an incandescent lamp bulb, by means of the mold 57. As the machine rotates toward station H the glass tubing is lowered, in order that the severing or cut-off may take place above the blown article and also allow a sufficient length for the blowing of another bulb thereon. Should the tubing be of such length that it would be impossible to complete another cycle, they would be discharged at this station and replaced by new lengths of tubing.

Figures 3, 15:
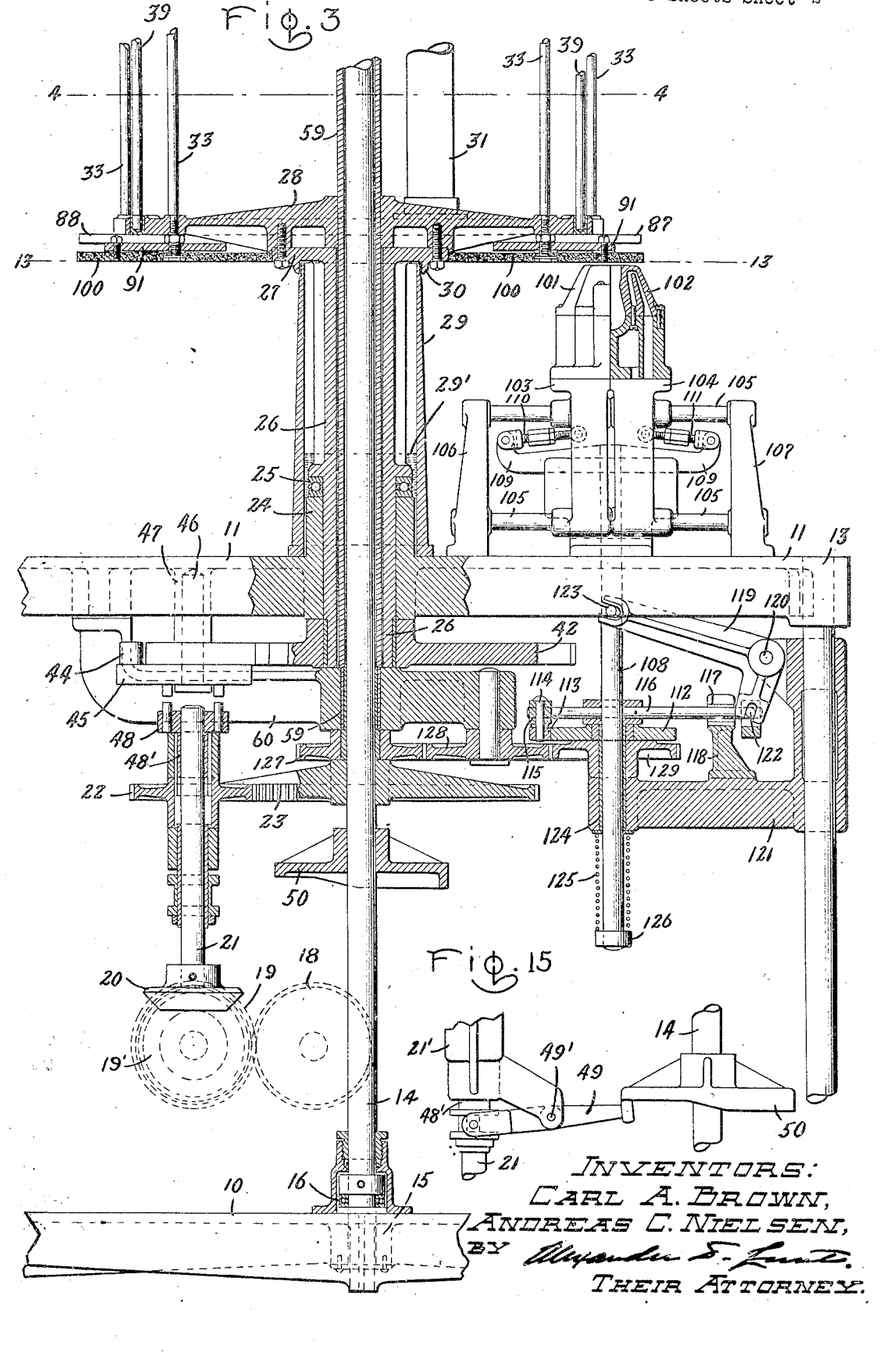
Fig. 3 is a fragmentary elevation partially in section along the line 3—3 of Fig. 1 showing the main driving and mould operating mechanism.
Fig. 15 is a fragmentary detail of the clutch raising mechanism.
Figure 4:
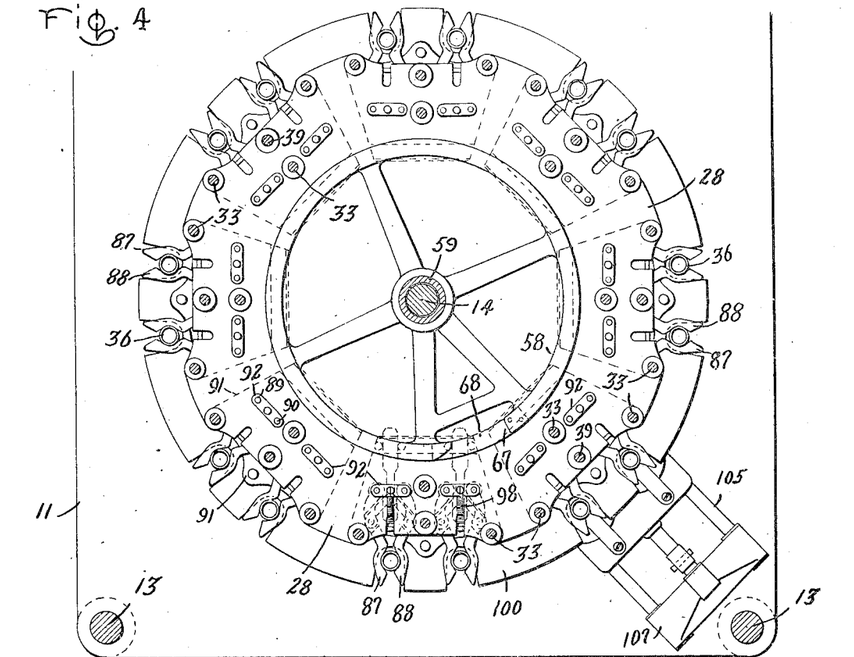
Fig. 4 is a horizontal section along the line 4—4 of Fig. 3.
Figure 5:
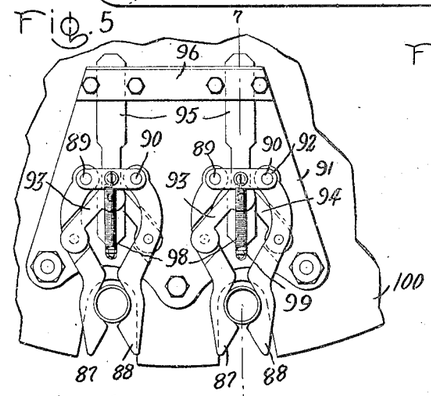
Fig. 5 is a fragmentary plan view showing the glass tube steadying and centering jaws.
Figure 6:
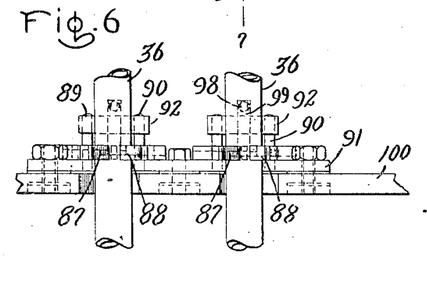
Fig. 6 is a front elevation thereof.
Figures 7, 16:
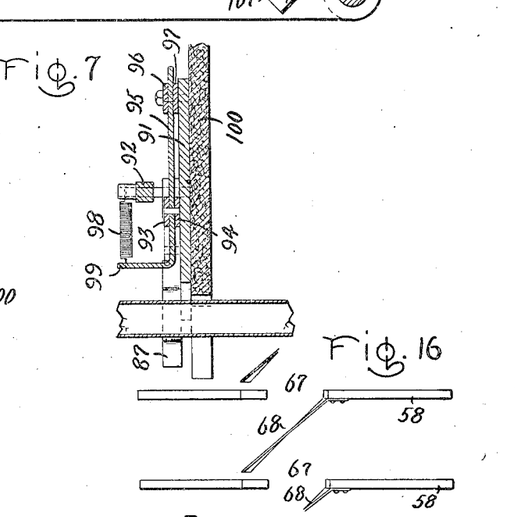
Fig. 7 is a vertical section along the line 7—7 of Fig. 5.
Fig. 16 is a detail of the feeding means.

The lowering of the heads 34 is accomplished by means of a number of circular tracks 58 (Figs. 2, 3 and 4) which are adjustably supported on a stationary hollow shaft 59 keyed to the stationary bracket 60 and extending up through the center of the machine. Each head 34 rests upon the circular tracks 58 through a pair of horizontal rods 61—62 (Figs. 8 and 10) which are slidably mounted in bearing 63 and terminate in a cross piece 64 which has extending therefrom a short shaft 65 having mounted thereon a roller 66. As the machine indexes the roller 66 follows the track 58 until it comes to a gap or escapement 67 (Figs. 4 and 16) whereupon the roller 66 slides down the guide 68 to the next lower circular track. This occurs each time a head has completed a cycle and produced a pair of bulbs. In the machine shown this gap is located between stations G and H (Fig. 4).

Figures 11, 12:
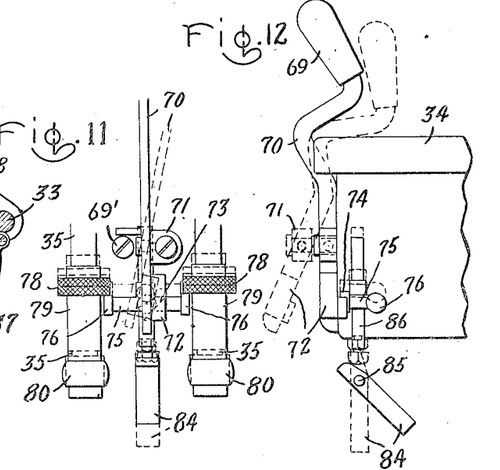
Figs. 11 and 12 are fragmentary details showing the operating lever.

The circular tracks 58 (Fig. 4) are spaced on the stationary shaft 59 so that when the head 34 reaches the bottom or lowermost track the glass tubing is used up, and it is necessary to remove the short lengths of tubing previous to replacing new ones. This is accomplished at the feed or loading station indicated as H on Fig. 13. At this station the operator throws the handle 69 of the head 34 sideways in the direction of the arrow (Figs. 9 and 11). The handle 69 is fastened to the arm 70 which is pivotally mounted on rod 62 by means of the extension 71 of the arm 70. Attached to the side of the arm 70 is a lug 72 which has an inclined surface 73 on which rests a roller 74 forming part of an operating yoke 75. The said yoke carries at each side thereof rollers 76 which have resting thereon under pressure of the springs 77 the washers 78 which are attached to the spindle sleeves 79 slidably mounted on the spindle 35. As the handle 69 is thrown sideways (Figs. 9 and 11) the operating yoke 75 is forced upward by means of the roller 74 traveling up the inclined surface 73 of the lug 72. Rollers 76 raise the washers 78 and spindle sleeves 79 upward against the springs 77 thus relieving the spring pressure on the tube gripping rubbers 80 allowing the glass tubes to fall therefrom upon the chute 80' where they are conveyed to a suitable container. The handle 69 is pulled back into the vertical position against the stop 69' by means of the spring 81 which is attached to the arm 70 and to the head 34. Prior to reloading the spindles 35 the operator pushes the handle 69 in the direction of the arrow toward the center of the machine (Figs. 10 and 12). This action pulls the roller 66 off and away from the circular track 58. At this time the operator also grips the stationary handle 82 and raises the head 34 to the top of the machine whereupon the handle is released and the roller 66 forced outward and upon the top track by the action of the spring 83. In order that the spring pressure on the gripping rubbers 80 be relieved during the loading operation a latch 84 is provided which is loosely pivoted on a cross pin 85. Said latch is held out of operative position by means of a guide pin 86 which is carried by the yoke 75 (Figs. 9, 10, 11 and 12). When the yoke 75 is raised upward as hereinbefore described, it lifts the pin 86, thus allowing the latch 84 to fall from an angular to a vertical position by gravity. As the latch 84 is on the same center line and directly under the pin 86, it holds the pin in the upward position, thus preventing the yoke 75 from returning until the spindles have been reloaded with new tubes. When loading the operator grips the new tube in each hand and slips them over the gripping rubbers 80 at the same time using the thumb of either hand to press the latch 84 backward, thus allowing the guide pin 86 and yoke 75 to fall downward freeing the action of the spring 77 to compress the rubbers 80 so as to grip and hold the tubes firmly.

At the time the upper ends of the glass tubing are placed on the rubbers 80, the lower ends are placed in certain means for guiding and steadying the tubing which rotates continuously during the operation of the machine. In the drawings, Figs. 3, 4, 5, 6 and 7, these means comprise jaws 87 and 88 pivotally mounted on pins 89 and 90 which extend from the plate 91 up through the spider 28 where they are held by means of the bridge 92. The jaws may be removed without disturbing the rest of the machine by simply lifting the bridge 92 from the pins 89 and 90. In order that the jaws be self centering they are pivotally connected by means of links 93 and 94 to a sliding bar 95 which is slidably mounted between the plates 96 and 97 fastened to the plate 91. The jaws 87 and 88 are opened against the tension of spring 98 which is attached to the extension 99 of the bar 95 and to the bridge 92. The plates 91 which carry the jaws 87 and 88 are attached to the lower spider 28 by being bolted on to the lower ends of the guide rods 33. An asbestos fire shield 100 is attached to the bottom of the plate 91 in order to protect all such parts which are in the neighborhood of the fires where they would be subject to the expansion and contraction as well as the corrosive effects of the heat.

As the head 34 reaches the bulb blowing position which is indicated as G (Figs. 3, 4 and 13) the mold 57 which comprises the mold members 101 and 102 are brought together so as to close about the ends of the glass tubing. The mold members 101 and 102 are mounted upon the beds 103 and 104 which are slidably mounted upon horizontal slide rods 105 being supported at each end by the brackets 106 and 107 which are fastened to the work table 11. The mold members are opened and closed by means of the vertical shaft 108 which extends up through a bearing or guide in the table 11 and has attached to its upper end a cross bar 109 which carries at each end thereof the adjustable links 110 and 111 which are pivotally attached to the sliding beds 103 and 104. The shaft 108 is reciprocated up and down by the action of the cam 112 roller 113 mounted on pin 114 carried by the cross piece 115. Attached to the cross piece 115 are a pair of horizontal rods 116 which are slidably supported at their opposite ends by the bearings 117 formed by the bracket 118. The horizontal movement of the rods 116 transmits a vertical movement to the shaft 108 by means of the crank 119 which is pivotally mounted at 120 to the stationary bracket 121, one end of the crank 119 being forked on the cross pin 122 between the rods 116 and the other end being forked on the pin 123 carried by the shaft 108. The lower end of the shaft 108 extends through a bearing 124 carried by the bracket 121. When the mold is in the closed position as shown in Fig. 3, the spring 125 which surrounds the shaft 108 and is supported between the bracket 121 and collar 126 is under compression. The cam 112 is driven from the central timing shaft 14 by means of the gears 127, 128 and 129.

Figure 1:
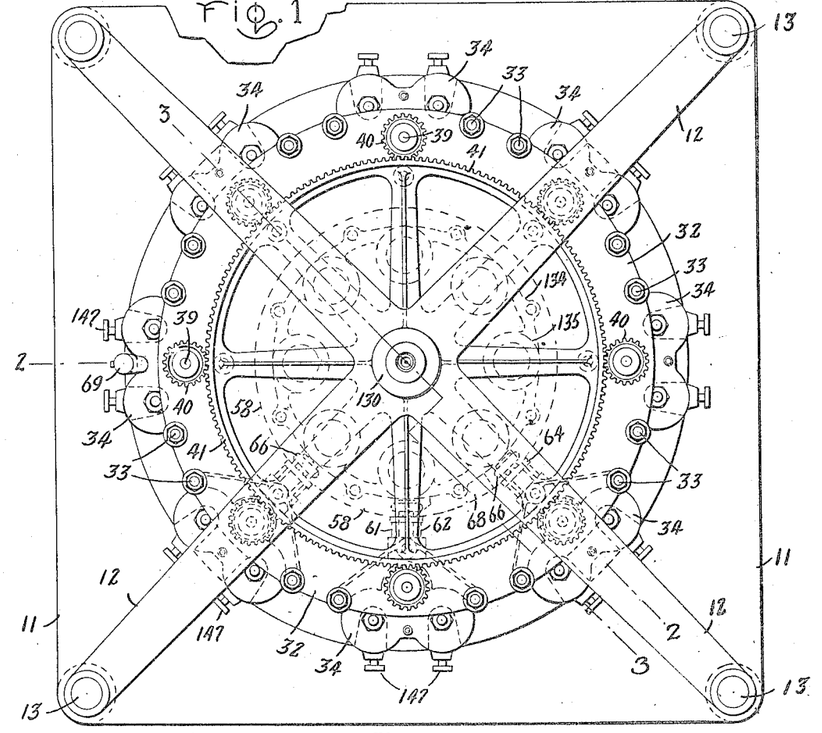
Fig. 1 is a plan view of the machine.
Figure 2:
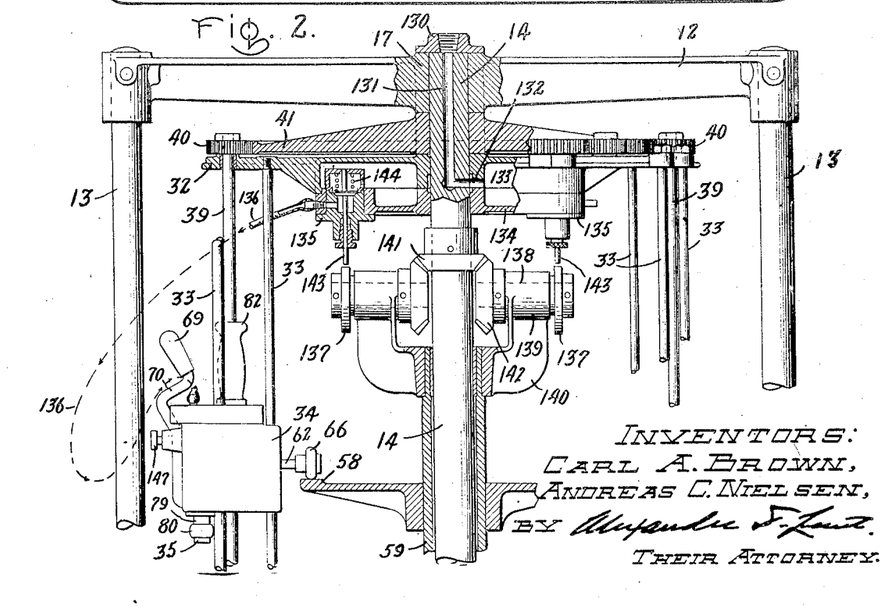
Fig. 2 is a fragmentary elevation of the uppermost portion of the machine.

After the molds have closed about the ends of the glass tubes, air is admitted for the purpose of blowing the bulbs. This air is supplied by means of a hose, not shown, attached to the hollow cap 130 which communicates with the passage 131 in the upper end of the shaft 14, said passage communicating with passage 132 which leads to the chamber 133 of the upper spider 32 forming part of the air reservoir as shown in Fig. 2. Attached to the upper spider 32 and also forming part of the air reservoir is the air valve mount 134 which carries the air valves 135, there being one valve for each head 34. A hose 136 forms the connection between the valves 135 and the heads 34. It may be desirable to admit air to the glass tubing prior to its reaching the final or bulb blowing station, and, as shown in Fig. 2, we provide two sets of mechanisms such as a pair of cams, although one cam for operating the air control mechanism at the final blowing station is all that is required. The blowing air is controlled by means of cams 137 mounted on shafts 138 extending through the bearings 139 carried by the bracket 140, said bracket being mounted on the stationary hollow shaft 59. The cams 137 are operated and timed by motion from the central timing shaft 14 through bevel gears 141 and 142. There are always two valves in position over the cams 137, one valve being in the preliminary blowing position and one being in the final blowing position. At the proper time the cams 137 raise the valve stems 143 against the action of the springs 144 thus allowing air to pass from the air reservoir through the hose connections 136 into the horizontal passages 145 of the heads 34, as shown in Fig. 9. The passages 145 communicate with the spindles 35 by means of holes 146 therein.

In order to regulate the amount of air which is to enter the spindles, means such as regulating stems 147 are provided which open or close passage 148 which connects the passage 145 to the outside atmosphere. The stems 147 are held in position by means of the flat springs 148'.

The operation of this machine is as follows: Assuming that the machine is just starting and the heads 34 are resting on the top circular track 58, the operator grips a length of tubing in each hand and slips them over the ends of the spindles 35 on to the gripping rubbers 80, at the same time with one foot pushes the lower ends of the tubing into the self centering jaws 87 and 88 which are used for guiding the lower ends thereof. Before the operator loosens his grip on the tubing he presses the latch 84 backward to free the action of the springs 77 which compress the rubbers 80 thereby holding the tubing on the spindles 35. The head is now indexed in the direction of the arrow (Fig. 13), from the loading station H to the first heating station A. At this station the lower ends of the tubing are preliminarily heated. The head is then indexed to station B where the tubing is heated at the point of cut off. At station C the tubing is cut off and the lower ends closed by means of the final cut off fires. At station D the tubes are again heated for the purpose of dressing and rounding out the lower ends thereof. At station E the tubes are again heated prior to receiving their final heating which is applied at station F. It is at this station that the lower ends of the tubing are intensively heated and the glass is plastic when the tubes are transferred to station G where they enter the mold mechanism 57, while air is admitted to the tubing by means of the valves 135. As the head is now indexed from station G to station H, the roller 66 which supports the head 34 rides on the circular track 58, until it reaches a gate 67 where it rides down the guide 68 (Fig. 4) thus bringing the head 34 on the next lower circular track 58 when the feeding or loading station H is reached. The cycle of operations is then repeated.

What we claim as new and desire to secure by Letters Patent of the United States, is:—

1. In an automatic machine for making glass articles, the combination of a substantially horizontally disposed carrier, a substantially vertically disposed guide attached to said carrier, a head supported independently of said carrier and slidably mounted on said guide and comprising means for receiving and retailing the end of a glass tube, means positioned to engage another portion of said tube and adapted to center it without supporting it, heating means adapted and arranged to be brought into operative relation to the free end of said tube, molding means adapted and arranged to engage said tube and mechanism whereby said heating and molding means are caused to operate in proper sequence.

2. In an automatic machine for making glass articles, the combination of a substantially horizontally disposed carrier, a plurality of substantially vertically disposed guides attached to said carrier, heads each comprising means for receiving and retaining the end of a glass tube slidably mounted on said guides and supported independently of said carrier so as to allow independent lowering of each head, means each positioned to engage another portion of each of said tubes and adapted to center it without supporting it, means for moving said carrier, heating means and molding means disposed in operative relation to the path of travel of the free ends of said tubes, and means whereby said heating and molding means are brought into operation in proper sequence and for proper intervals.

3. In an automatic machine for making glass articles, the combination of a substantially horizontally disposed carrier, a plurality of substantially vertically disposed guides attached to said carrier, heads each comprising means for receiving and retaining the end of a glass tube slidably mounted on said guides and supported independently of said carrier so as to allow independent lowering of each head, means each positioned to engage another portion of each of said tubes and adapted to center it without supporting it, means for moving said carrier, heating means and molding means disposed in operative relation to the path of travel of the free ends of said tubes, and means whereby said heating and molding means are brought into operation in proper sequence and for proper intervals.

4. In an automatic machine for making glass articles, the combination of a substantially horizontally disposed carrier, a substantially vertically disposed guide attached to said carrier, a head slidably mounted on said guide and comprising means for receiving and retaining the end of a glass tube, means for rotating said tube, means positioned to engage another portion of said tube and adapted to center it without supporting it, heating means adapted and arranged to be brought into operative relation to the free end of said tube, molding means adapted and arranged to engage said tube and mechanism whereby said heating and molding means are caused to operate in proper sequence.

5. In an automatic machine for making glass articles, the combination of a substantially horizontally disposed carrier, a substantially vertically disposed guide attached to said carrier, a head slidably mounted on said guide and comprising means for receiving and retaining the end of a glass tube, means disposed above the upper end of said tube for rotating the same, means positioned to engage another portion of said tube and adapted to center it without supporting it, heating means adapted and arranged to be brought into operative relation to the free end of said tube, molding means adapted and arranged to engage said tube and mechanism whereby said heating and molding means are caused to operate in proper sequence.

6. In an automatic machine for making glass articles, the combination of a substantially horizontally disposed carrier, a substantially vertically disposed guide attached to said carrier, a head comprising means for receiving and retaining the end of a glass tube slidably mounted on said guide and supported independently of said carrier, means comprising a drive disposed adjacent to said carrier for rotating said tube, means positioned to engage another portion of said tube and adapted to center it without supporting it, heating means adapted and arranged to be brought into operative relation to the free end of said tube, molding means adapted and arranged to engage said tube and mechanism whereby said heating and molding means are caused to operate in proper sequence.

7. In an automatic machine for making glass articles, the combination of upper and lower substantially horizontally disposed carriers, a substantially vertically disposed guide extending between said carriers, a head comprising means for receiving and retaining the end of a glass tube slidably mounted on said guide and supported independently of said guide and carriers, means positioned to engage another portion of said tube and adapted to center it without supporting it, heating means adapted and arranged to be brought into operative relation to the free end of said tube, molding means adapted and arranged to engage said tube and mechanism whereby said heating and molding means are caused to operate in proper sequence.

8. In an automatic machine for making glass articles, the combination of upper and lower substantially horizontally disposed carriers, a substantially vertically disposed guide extending between said carriers, a head slidably mounted on said guide and comprising means for receiving and retaining the end of a glass tube, means comprising a drive disposed adjacent to said upper carrier for rotating said tube, means positioned to engage another portion of said tube and adapted to center it without supporting it, heating means adapted and arranged to be brought into operative relation to the free end of said tube, molding means adapted and arranged to engage said tube and mechanism whereby said heating and molding means are caused to operate in proper sequence.

9. In an automatic machine for making glass articles, the combination of a substantially horizontally disposed carrier, a substantially vertically disposed guide attached to said carrier, a head slidably mounted on said guide and comprising means for receiving and retaining the end of a glass tube, means independent of said guide and of said carrier for supporting said head and for allowing it to periodically lower along said guide, means positioned to engage another portion of said tube and to allow substantially vertical movement of said tube therethrough, heating means adapted and arranged to be brought into operative relation to the free end of said tube, molding means adapted and arranged to engage said tube and mechanism whereby said heating and molding means are caused to operate in proper sequence.

10. In an automatic machine for making glass articles, the combination with a guide-rod of a head mounted for substantially vertical movement and comprising means for receiving and retaining a plurality of glass tubes, means independent of said guide-rod for periodically lowering said head, means mounted in operative relation to the ends of said tubes and adapted to heat said ends simultaneously and means thereafter brought into operation for simultaneously forming the glass articles therefrom.

11. In an automatic machine for making glass articles, the combination of a substantially horizontally disposed carrier, a substantially vertically disposed guide attached to said carrier, a head slidably mounted on said guide and comprising means for receiving and retaining the end of a glass tube, means independent of said guide and of said carrier for supporting said head and for allowing it to periodically lower along said guide, means positioned to engage another portion of said tube and to allow substantially vertical movement of said tube therethrough, heating means adapted and arranged to be brought into operative relation to the free end of said tube, and to maintain a heating zone out of line with said head supporting and lowering means, molding means adapted and arranged to engage said tube and mechanism whereby said heating and molding means are caused to operate in proper sequence.

12. In an automatic machine for blowing glass articles, a central standard, a carrier rotatably mounted thereon, a plurality of substantially vertically disposed guides attached to said carrier, heads slidably supported on said guide and each comprising means for receiving and retaining the end of a glass tube, a means for supporting said heads consisting of members projecting from said heads and a track engaging and supporting said members and shaped so as to allow the heads to gradually descend as the carrier is rotated.

In witness whereof, we have hereunto set our hands this 21st day of April, 1924.

CARL A. BROWN.
ANDREAS C. NIELSEN.